United States Patent [19]

Asano

[11] Patent Number: 5,005,081
[45] Date of Patent: Apr. 2, 1991

[54] METHOD AND APPARATUS FOR REDUCING NOISE IN A VIDEO SIGNAL

[75] Inventor: Mitsuyasu Asano, Tokyo, Japan

[73] Assignee: Sony Corporation, Tokyo, Japan

[21] Appl. No.: 294,663

[22] PCT Filed: Mar. 18, 1988

[86] PCT No.: PCT/JP88/00286
§ 371 Date: Jan. 10, 1989
§ 102(e) Date: Jan. 10, 1989

[87] PCT Pub. No.: WO88/07307
PCT Pub. Date: Sep. 22, 1988

[30] Foreign Application Priority Data
Mar. 20, 1987 [JP] Japan .................... 62-67403

[51] Int. Cl.$^5$ ............................ H04N 5/213
[52] U.S. Cl. ....................... 358/167; 358/36
[58] Field of Search ............. 358/167, 36, 166, 37, 358/905

[56] References Cited
U.S. PATENT DOCUMENTS

| | | | |
|---|---|---|---|
| 4,571,613 | 2/1986 | Fukuda | 358/36 |
| 4,709,269 | 11/1987 | Ozaki | 358/167 |
| 4,768,498 | 5/1988 | Yamanishi | 358/36 |
| 4,860,105 | 8/1989 | Sakaguchi | 358/167 |
| 4,885,639 | 12/1989 | Nakata | 358/167 |
| 4,961,113 | 10/1990 | Okada | 358/167 |
| 4,962,434 | 10/1990 | Matsuo | 358/167 |

FOREIGN PATENT DOCUMENTS
54-53923 4/1979 Japan .

Primary Examiner—Tommy P. Chin
Attorney, Agent, or Firm—Philip M. Shaw, Jr.

[57] ABSTRACT

A noise reduction circuit in which a first signal ($S_{H2}$) is obtained by passing the input video signal ($S_I$) through a low frequency shut-off filter (10) and another a limiter (11), a second before signal ($S_{H21}$) is obtained by passing the above obtained signal ($S_{H2}$) through a field or frame delay circuit (5) and the difference between the two signals ($S_{H2}-S_{H21}$) is subtracted from the above input video signal ($S_I$) so as not to lower the definition of image, the noise reduction circuit being capable of application in a television receiver etc.

11 Claims, 7 Drawing Sheets

METHOD AND APPARATUS FOR REDUCING NOISE IN A VIDEO SIGNAL

DESCRIPTION

1. Technical Field:

This invention relates to a noise reduction circuit for video signals used in, for instance, a television receiver.

2. Background Art

As a noise reduction circuit used in a television receiver or the like, those shown in FIGS. 9 and 10 are hitherto known in which a delay circuit such as a field memory (or a frame memory) is used.

FIG. 9 shows one forming an open-loop, in which input video signal $S_I$ containing noise and fed at input terminal 1 is supplied to adders 2 and 3, and is also supplied to A/D converter 4 for converting it into a digital signal. It is then written in to field memory 5, which functions as a delay circuit. The digital signal read from memory 5 is converted back into an analog signal $S_{I1}$ by D/A converter 6. Accordingly, this analog signal $S_{I1}$ is delayed by a field in relation to the above signal $S_I$.

This signal $S_{I1}$ is supplied to adder 2 and subtracted from the above signal $S_I$ The difference signal $S_I-S_{I1}$ between signal $S_I$ and signal $S_{I1}$ is obtained from adder 2 and is supplied to movement detection circuit 7 and to multiplier 8. The above difference signal $S_I-S_{I1}$ is considered a noise component if there is no movement in input signal $S_I$ within a field. In this case, difference signal $S_I-S_{I1}$ is multiplied by coefficient k at multiplier 8 in accordance with detection signal $S_M$ from detection circuit 7 and then subtracted from signal $S_I$ at adder 3. Therefore, output signal $S_o$ in which noises are reduced is obtained from adder 3 at output terminal 9.

When a movement is detected by movement detection circuit 7, the above difference signal $S_I-S_{I1}$ is considered to contain a movement component so multiplier 8 reduces the value of K in accordance with signal $S_M$ from detection circuit 7 to reduce the quantity of the movement component subtracted at adder 3.

Movement detection circuit 7 detects the level of the above difference signal $S_I-S_{I1}$, and produces, detection signal $S_M$ with which coefficient K of multiplier 8 is controlled. This movement detection circuit 7 may also be placed to compare the input signal and output signal of field memory 5 with each other as shown by dotted lines in the drawing.

FIG. 10 shows an instance forming a closed loop, in which signal $S_{I1}$ that a part which is output signal $S_o$ delayed by a field in memory 5, is subtracted from signal $S_I$ at adder 2 and that difference signal $S_I-S_{I1}$ is passed through multiplier 8 and subtracted from signal $S_I$ at adder 3. Thus, noise contained by signal $S_o$ is gradually removed by feeding back signal $S_o$, after delaying it by a field, so that $S_o$ is obtained from adder 3 with noise reduced.

A noise reduction circuit using a frame memory as disclosed by Patent Kokai Sho 54-157429 is known.

DISCLOSURE OF THE INVENTION

The noise reduction circuit using a delay circuit such as a field memory (or a frame memory) as described above has need of both a memory of large capacity, to avoid lowering the definition of image, and a movement detection circuit so it has a defect in that the circuit configuration becomes large.

To overcome such a defect, in a noise reduction circuit according to the present invention, a difference signal is obtained which is the difference between a signal obtained by passing the original video signal through a low frequency shut-off filter and a limiter and the signal obtained by passing that signal through a field or frame delay circuit. The difference signal is then subtracted from the original video signal.

According to the noise reduction circuit of the present invention the part of the signal having an amplitude lower than a predetermined value is taken out by the limiter from the high frequency component of the signal obtained from the filter, and the difference in the field or frame of this signal is detected. Therefore, noise reduction is effected without lowering the definition. A movement component is not contained by the high frequency component of the signal because any movement component, is low frequency. Therefore, any signal difference in the field or frame is considered a noise component.

Accordingly, in the noise reduction circuit of the present invention, the movement detection circuit used in a conventional noise reduction circuit can be omitted and the definition of image is not lowered. Further, a field memory or a frame memory of especially large capacity is not required.

THE BEST MODE FOR CARRYING OUT THE INVENTION

Figure 1:
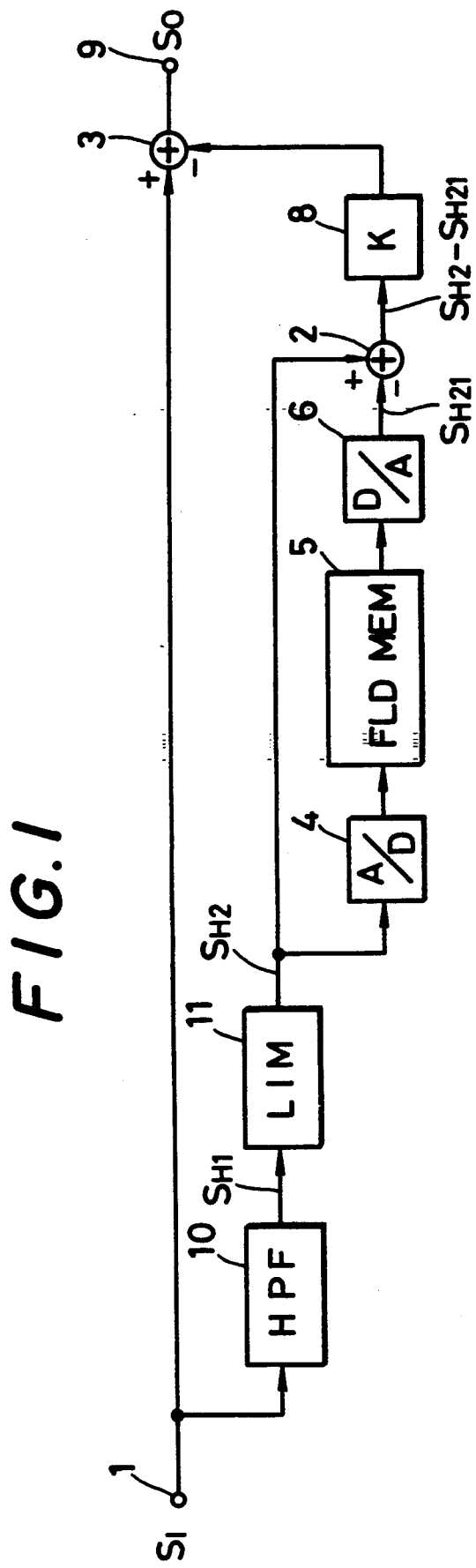
FIG. 1 is a block diagram showing a first embodiment of the invention.
Figure 9:
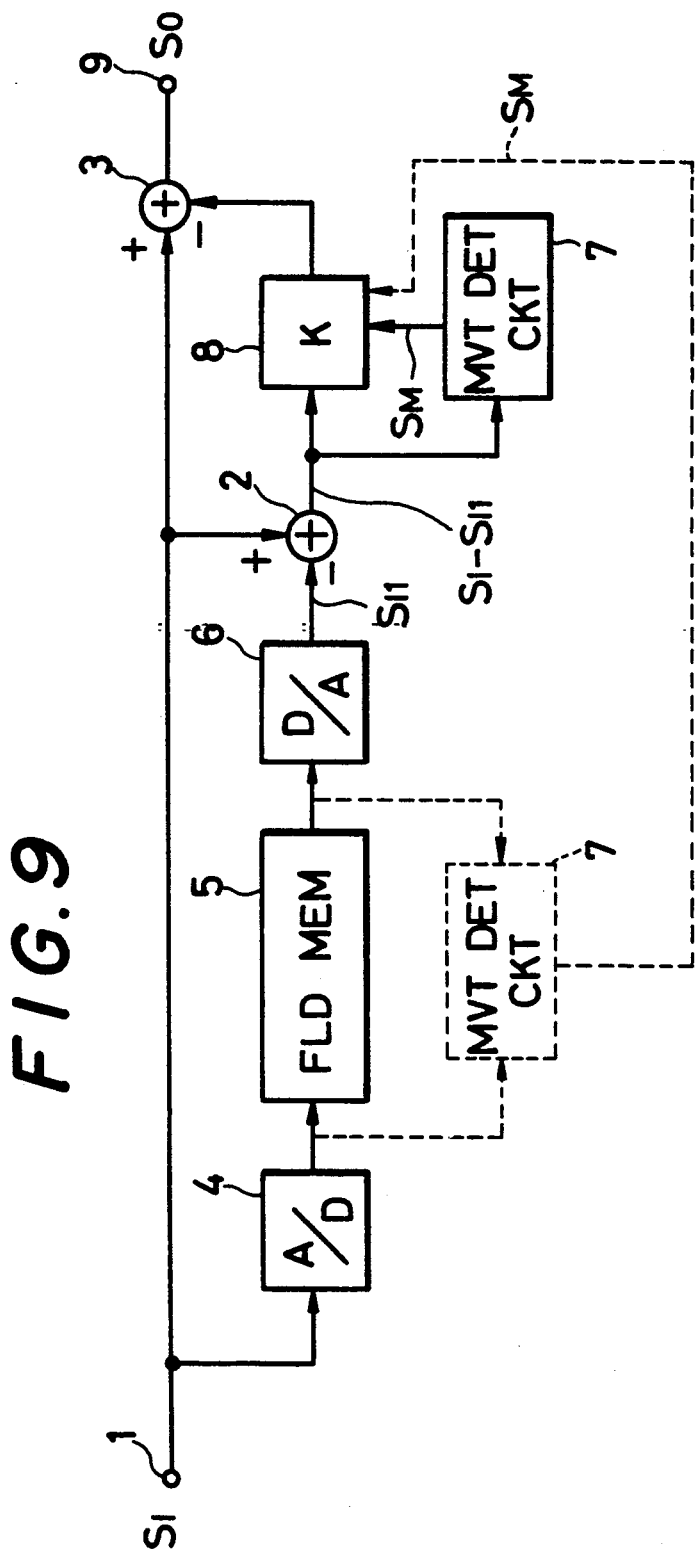
FIGS. 9 and 10 are block diagrams of conventional noise reduction circuits.
Figure 10:
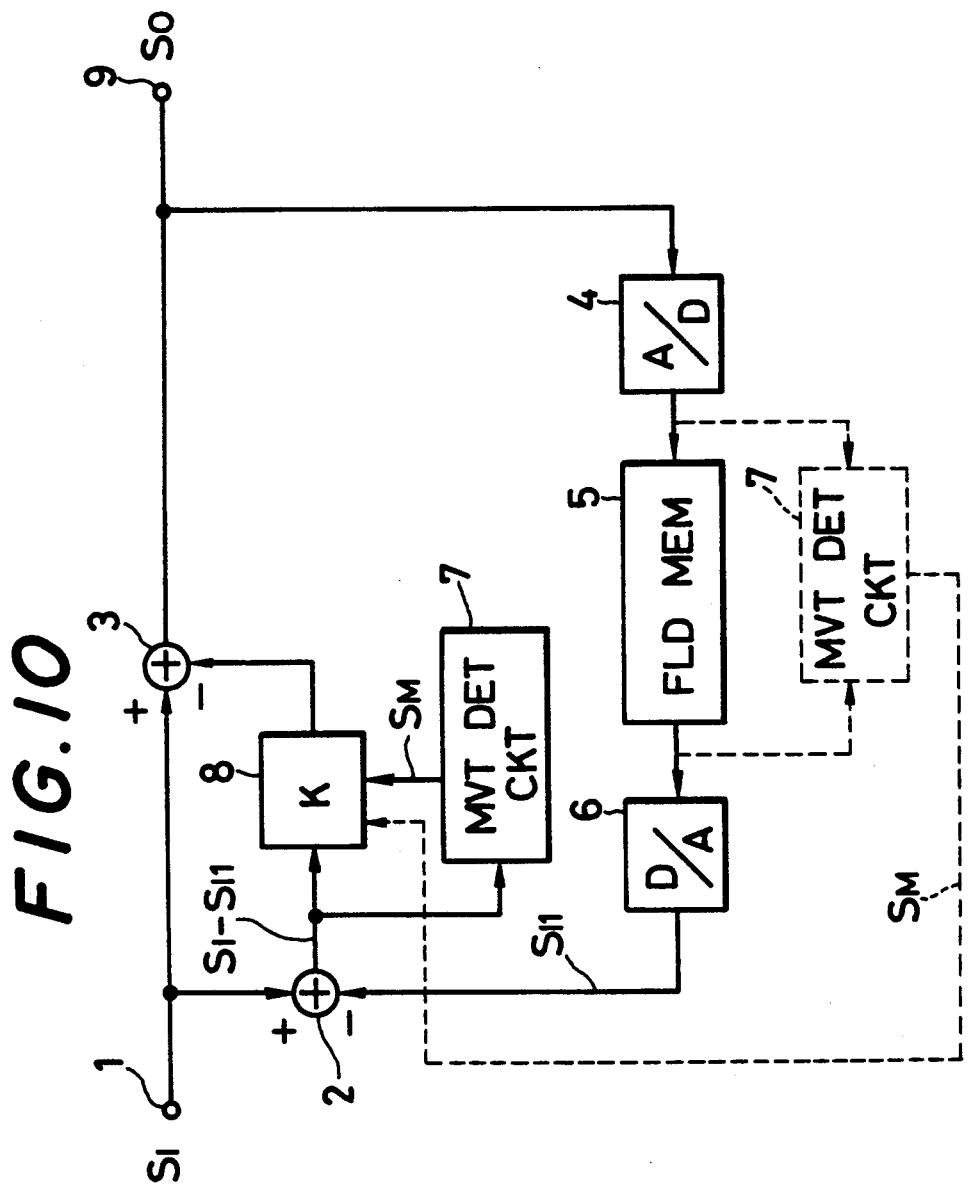

FIG. 1 shows a first embodiment of the invention, in which parts corresponding to those of FIG. 9 are denoted by the same references as those of FIG. 9 to omit the descriptions.

Figure 2A:
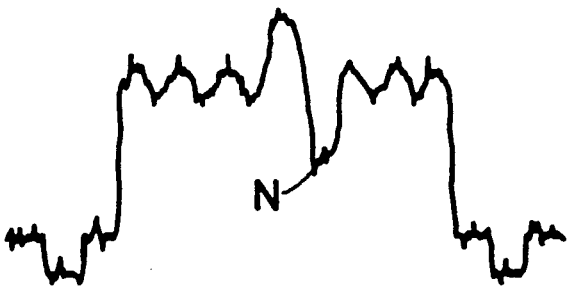
FIGS. 2 are wave form charts of signals at points of FIG. 1.
Figure 2B:
Figure 2C:
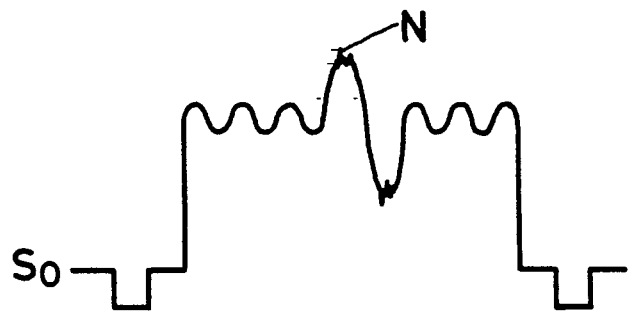
Figure 3:
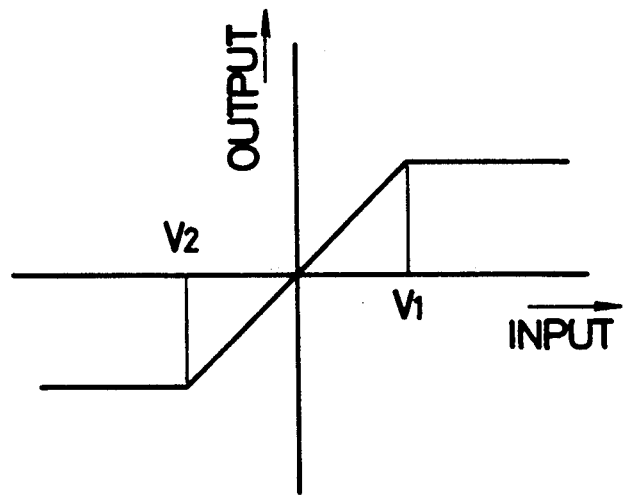
FIG. 3 is a graph showing the characteristic of the limiter of FIG. 1.

In FIGS. 1 and 2, input signal $S_I$ containing noise N is applied to input terminal 1 and thus supplied to adder 3 and to high-pass filter 10, a low frequency shut-off filter. High frequency signal $S_{H1}$ obtained from this high-pass filter 10 is supplied to limiter 11. This limiter 11 has the input to output characteristic shown in FIG. 3, in which a variable output signal is obtained between $V_1$ and $V_2$ of input signal and the output signal becomes constant when the level of input signal is out of the range between $V_1$ and $V_2$. Accordingly, any signal between $V_1$ and $V_2$ in the high frequency signal $S_{H1}$, that is, signal $S_{H2}$ containing a noise component, is obtained from limiter 11. This signal $S_{H2}$ is supplied to adder 2 and delayed by a field through A/D converter 4, field memory 5 and D/A converter 6 to become signal $S_{H21}$ and then subtracted from signal $S_{H2}$ at adder 2.

The above high frequency signals $S_{H2}$ and $S_{H21}$ contain little movement component because the movement of image is low frequency in general. Therefore, unless difference signal $S_{H2}$-$S_{H21}$ obtained from adder 2 is zero, it can be substantially considered a noise component. Thus, this embodiment has no need of the movement detection circuit 7 of FIGS. 6 and 7 so it is omitted.

The above difference signal $S_{H2}$-$S_{H21}$ is subtracted from input signal $S_I$ at adder 3 after being multiplied by a coefficient K at multiplier 8 to obtain signal $S_o$ with reduced noise at output terminal 9.

In this embodiment, since noise detection is effected with memory 5 in relation only to signal $S_{H2}$ which is of small amplitude since it has been passed through limiter 11, the capacity of memory 5 can be smaller than it would be if used to delay. The entire band of input signal $S_I$, as shown in FIG. 9. Experiments have confirmed that the number of bits of signal processed by D/A converter 4, memory 5 and D/A converter 6 can be deceased from the conventional 8 bits to 6 bits.

Figure 4:
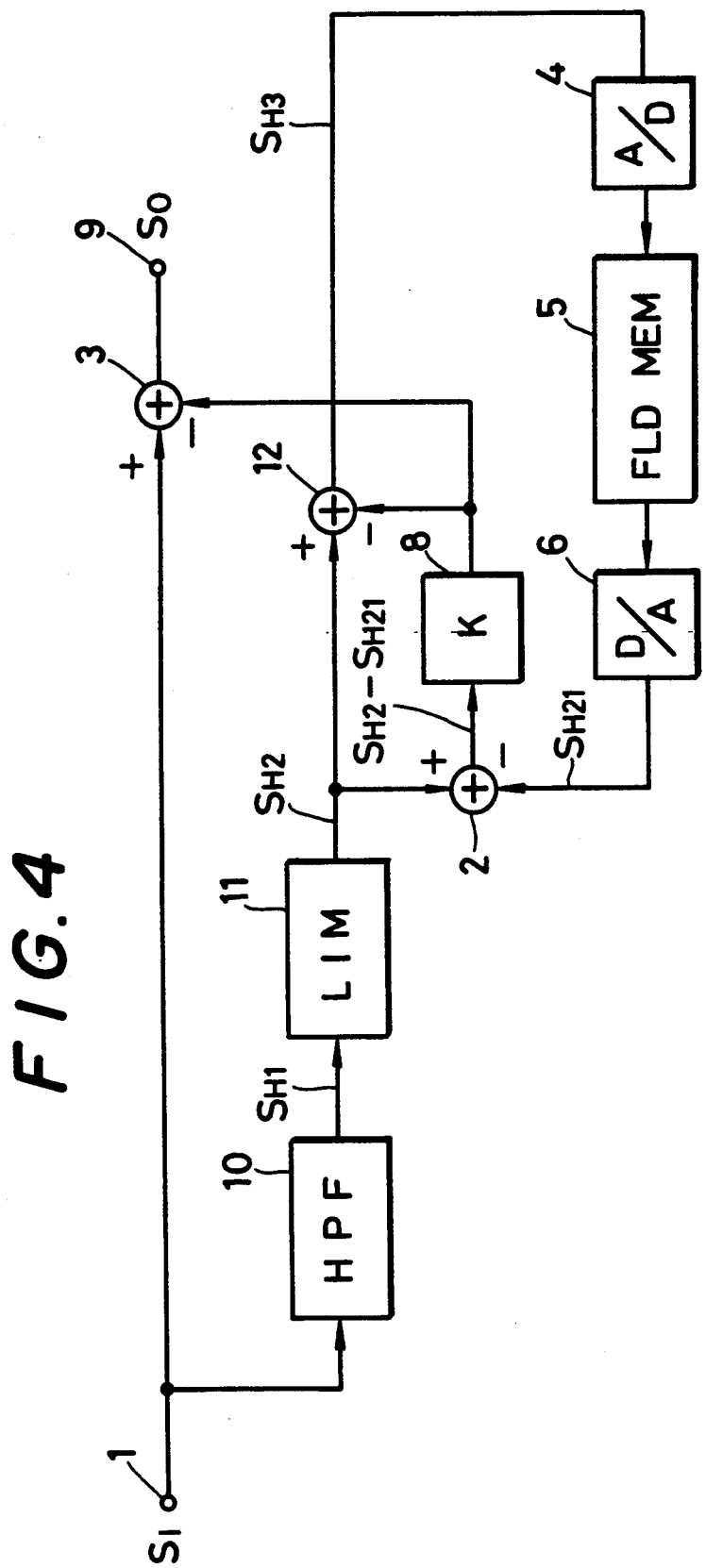
FIG. 4 is a block diagram showing a second embodiment of the invention.

FIG. 4 shows a second embodiment, in which parts corresponding to those of FIG. 1 are denoted by the same references as those of FIG. 1 to omit the descriptions.

While the above first embodiment of FIG. 1 uses an open-loop, a closed loop is formed in this embodiment.

In FIG. 4, to become signal $S_{H3}$, which that 12 signal $S_{H2}$ is passed through adder 12 is delayed by a field through A/D converter 4, field memory 5 and D/A converter 6 to be signal $S_{H21}$, which is then subtracted from signal $S_{H2}$ at adder 2. Difference signal $S_{H2}$-$S_{H21}$ obtained from adder 2 is supplied to adder 12 through multiplier 8 to be subtracted from signal $S_{H2}$ to obtain the above signal $S_{H3}$, which is fed back through memory 5. This embodiment is a feedback circuit in which field memory 5 is in a feedback loop and difference signal $S_{H2}$-$S_{H21}$ is obtained with signal $S_{H21}$ from the feedback loop and $S_{H2}$. As in the first embodiment, the difference signal $S_{H2}$-$S_{H21}$ is multiplied by coefficient K and then subtracted from $S_1$ to obtain output signal $S_O$ having reduced noise.

Figure 5:
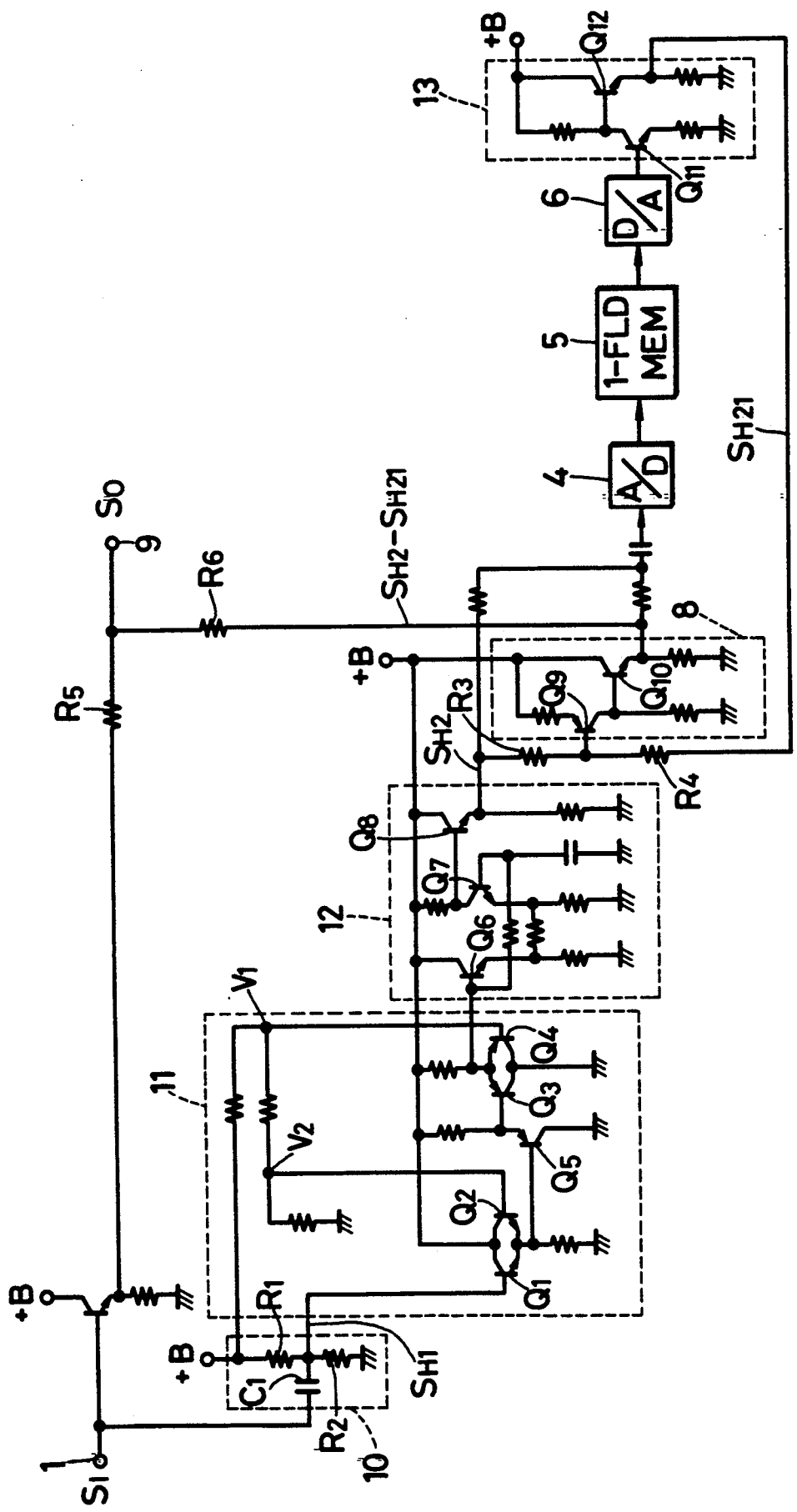
FIG. 5 is a circuit diagram showing an embodiment of a concrete circuit configuration of FIG. 4.

FIG. 5 shows a concrete circuit configuration of each of circuit blocks of FIG. 4, in which parts corresponding to those of FIG. 4 are denoted by the same references as those of FIG. 4.

In FIG. 5, the above high-pass filter 10 comprises capacitor $C_1$ and resistances $R_1$ and $R_2$ and its cut-off frequency is selected to, for instance, 500 KHz.

The above limiter 11 is constructed by connecting a differential circuit of transistors $Q_1$ and $Q_2$ and a differential circuit of transistors $Q_3$ and $Q_4$ to each other in series through transistor $Q_5$. Voltage $V_2$ is applied to the base of transistor $Q_2$ and voltage $V_1$ is applied to the base of transistor $Q_4$. Accordingly, when signal $S_{H1}$ is beyond $V_2$, transistor $Q_1$ is turned on so that its output signal is applied to the base of transistor $Q_3$ through transistor $Q_5$. When this base voltage is beyond $V_1$, transistor $Q_3$ is turned on so that its output signal is amplified by amplifier 15 comprising transistors $Q_6$, $Q_7$ and $Q_8$ to obtain signal $S_{H2}$. The above transistor $Q_5$ compensates for the voltage drop between the base and emitter of transistor $Q_1$.

The above signal $S_{H2}$ is supplied to A/D converter 4 after the output of amplifier 8 (multiplier 8 in FIG. 4), comprising transistors $Q_9$ and $Q_{10}$ is added to create signal $S_3$. Signal $S_{H3}$ is converted into, for instance, a 6-bit digital signal by A/D converter 4 and reconverted into analog signal by D/A converter 6 after being delayed by 1-field memory 5, and then inverted by inversion amplifier 13 comprising transistors $Q_{11}$ and $Q_{12}$. This inverted signal is taken out as the above signal $S_{H21}$, which is added to signal $S_{H2}$ through resistances $R_3$ and $R_4$, and this sum signal is supplied to the above amplifier 8.

Signal, and $S_{H2}$-$S_{H21}$ obtained as above is multiplied by amplifier 8 and added to signal $S_1$ through resistances $R_5$ and $R_6$ to obtain output signal $S_o$.

Although a field memory 5 is used in the first and second embodiments, a frame memory may also be used.

Next, high-pass filter 10 will be described.

If high-pass filter 10 is such a simple design as resistances $R_1$ and $R_2$ capacitance $C_1$ as shown in FIG. 5, it is observed that noise is shifted laterally when to it is great, for instance, where the input field strength is small and, the S/N ratio is bad. To improve this, if the filter is made to have a group delay characteristic to equalize the delay time independently of the frequency, the above phenomenon can be suppressed. An example of a high-pass filter of this case is shown in FIG. 6.

Figure 6:
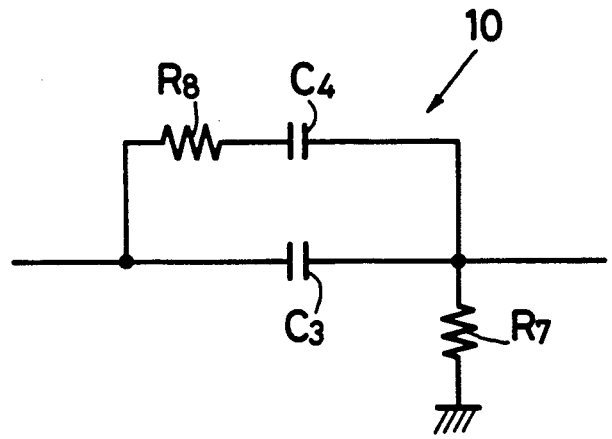
FIGS. 6 to 8 are circuit diagrams showing embodiments of a high-pass filter.

In FIG. 6, capacitance $C_3$ and resistance $R_7$ are connected in parallel to each other, and a series circuit of resistance $R_8$ and capacitance $C_4$ is connected parallelly to capacitance $C_3$.

Figure 7:
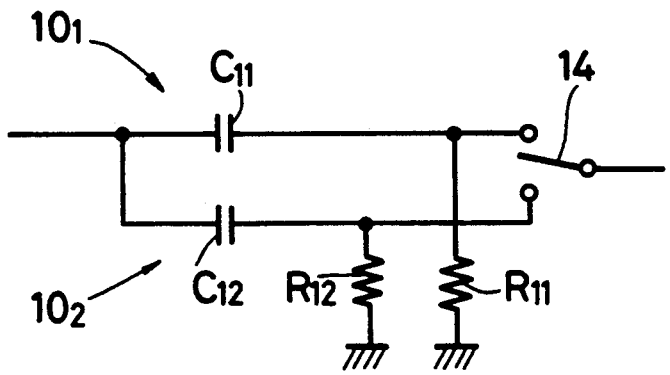

As shown in FIG. 7, two high-pass filters $10_1$ and $10_2$ may be provided which are switched by switch 14. Here, high-pass filter $10_1$ with the cut-off frequency of e.g., 500 KHz is constituted by capacitance $C_{11}$ and resistance $R_{11}$, and high-pass filter $10_2$ with a cut-off frequency of several KHz is constituted by capacitance $C_{12}$ and resistance $R_{12}$. These high-pass filters $10_1$ and $10_2$ are alternately selected with switch 14.

When noise is low, the cut-off frequency is set to a high frequency of 500 KHz so as, not to eliminate any movement component. When noise is great, it may be helpful to reduce noise by lowering the cut-off frequency to several KHz even with the resulting sacrifice of reduction of the movement component. The changeover may be effected manually with switch 14 as shown in FIG. 7. Alternatively, switch 14 may be automatically driven with a signal reflecting the input field strength such as the AGC control voltage level of the tuner. Although the preferred cut-off frequency of capacitance $C_{12}$ and resistance $R_{12}$ is several KHz, the cut-off frequency may be scores Hz or several Hz.

Figure 8:
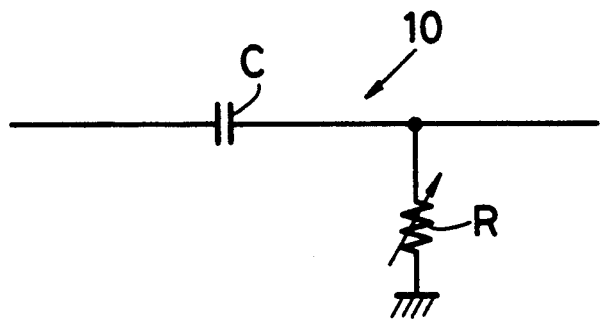

The high-pass filter may be comprised of a capacitance C and variable resistance R to vary the cut-off frequency continuously as shown in FIG. 8. Variable resistance R may be controled manually or automatically in accordance with the above AGC voltage so that the cut-off frequency ranges between 500 KHz and several Hz.

The detection of input field strength may also be effected by detecting the noise level in a synchronizing signal rather than by utilizing the above AGC voltage.

CAPABLE OF EXPLOITATION IN INDUSTRY

According to the present invention, the movement detection circuit which is used in a conventional noise reduction circuit can be eliminated, and the definition of image does not decrease. Further, it has no need of a field memory or a frame memory of especially large capacity. Therefore, the present invention is capable of application in a television receiver, etc.

I claim:

1. A method of reducing noise in a video signal, comprising:
    passing said video signal through a high pass filter to create a high frequency signal;
    passing said high frequency signal through a limiter to produce a first signal;
    delaying said first signal to produce a second signal;
    subtracting said second signal from said first signal to produce a difference signal;
    subtracting said difference signal from said video signal such that any noise in said video signal is reduced.

2. A method according to claim 1 in which the step of delaying said first signal further comprises using a field delay circuit to delay said first signal.

3. A method according to claim 1 in which the step of delaying said first signal further comprises using a frame delay circuit to delay said first signal.

4. A method according to claim 1 further comprising the steps of converting said first signal from an analog signal to a digital signal prior to delaying said first signal and converting said delayed signal from a digital signal to an analog signal prior to subtracting said second signal from said first signal.

5. A circuit for reducing noise in a video signal, comprising:
    a high pass filter through which said video signal is passed to produce a high frequency signal;
    a limiter through which said high frequency signal is passed to produce a first signal,
    means for delaying said first signal to produce a second signal;
    means for subtracting said second signal from said first signal to produce a difference signal;
    means for subtracting said difference signal from said video signal such that any noise in said video signal is reduced.

6. A circuit according to claim 5 in which the means for delaying said first signal comprises a field delay circuit.

7. A circuit according to claim 5 in which the means for delaying said first signal comprises a frame delay circuit.

8. A circuit according to claim 5 further comprising an analog to digital converter located between said limiter and said means for delaying said first signal and a digital to analog converter located between said means for delaying said first signal and said means for subtracting said second signal from said first signal.

9. A method of reducing noise in a video signal, comprising:
    passing the video signal through a high pass filter to create a high frequency signal;
    passing the high frequency signal through a limiter to produce a first signal;
    passing the first signal to a junction;
    delaying the signal present at the junction to produce a second signal;
    subtracting the second signal from the first signal to produce a difference signal;
    subtracting the difference signal from the first signal at the junction; and
    subtracting the difference signal from the video signal such that any noise in the video signal is reduced.

10. A circuit for reducing noise in a video signal, comprising:
    a high pass filter through which the video signal is passed to produce a high frequency signal;
    a limiter through which the high frequency signal is passed to produce a first signal;
    an adder having as one input the first signal and as an output a second signal;
    means for delaying the second signal to produce a third signal;
    means for subtracting the third signal from the first signal to produce a difference signal;
    means for providing the difference signal to said adder as a second and negative input such that the difference signal is subtracted from the first signal to produce the second signal; and
    means for subtracting the difference signal from the video signal such that any noise in the video signal is reduced.

11. A circuit for reducing noise in a video signal, comprising:
    a high pass filter having an input and output, to which the video signal is input;
    a limiter having an input and output, the input of which is connected to the output of the high pass filter;
    a first adding means having two inputs and an output, one input of which is connected to the output of the limiter;
    delay means having an input and output, the input of which is connected to the output of the first adding means;
    a second adding means having two inputs and an output, one input of which is connected to the output of the limiter and the other input of which is a negative input and is connected to the output of the delay means, and the output of which is connected to the second input of the first adding means as a negative input;
    a third adding means having two inputs and an output, one input of which is the video signal and the other input of which is a negative input and is connected to the output of the second adding means, and thus having as its output a video signal in which noise has been reduced.

* * * * *